May 29, 1923.
G. F. LYON
1,456,809
PROCESS FOR TREATING WOOD
Filed Feb. 15, 1921
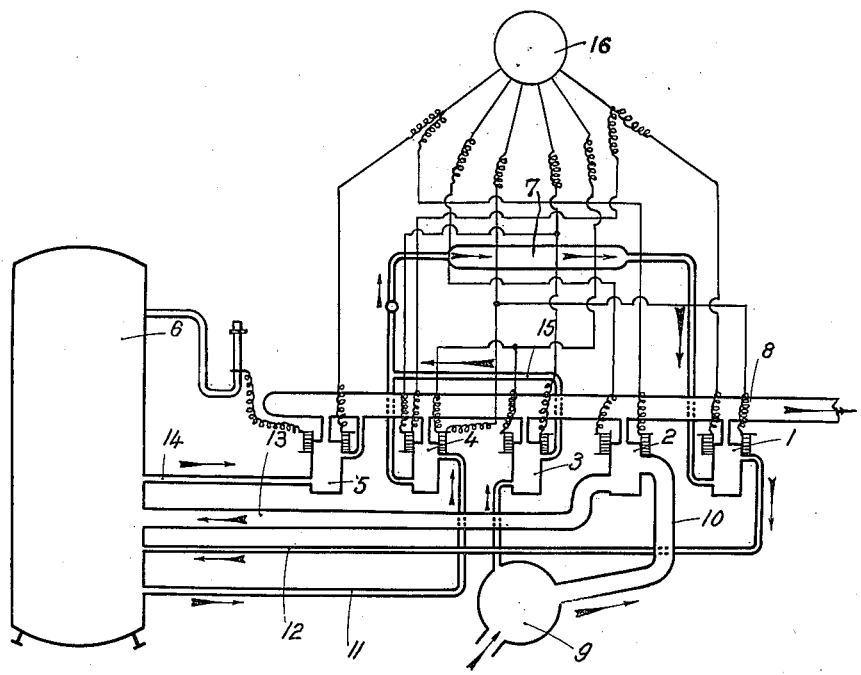
INVENTOR
Gustave F. Lyon,
by Chas. J. O'Neill,
ATTORNEY Patented May 29, 1923.

1,456,809

UNITED STATES PATENT OFFICE.

GUSTAVE FRANTZ LYON, OF PARIS, FRANCE.

PROCESS FOR TREATING WOOD.

Application filed February 15, 1921. Serial No. 445,193.

*To all whom it may concern:*

Be it known that I, GUSTAVE FRANTZ LYON, engineer, citizen of the Republic of France, residing at Paris, Department of the Seine, in France, and having P. O. address 22 Rue de Rochechouart, in the said city, have invented certain new and useful Improvements in Processes for Treating Wood; and I do hereby declare the following to be a full, clear, and exact description of the invention, such as will enable others skilled in the art to which it appertains to make and use the same.

This invention has for its object a process for treating wood which ensures its drying under circumstances which are particularly favourable to its qualities. The process consists in submitting the wood, for a certain time, to the alternate actions of treatment in dry ozonized air and under reduced pressure.

The accompanying figure is a diagrammatic view of a plant designed to carry out the present process. In said figure, 6 represents the chamber in which the wood to be cured is placed, said chamber being connected by suitable pipes to the apparatus required. The vacuum pipe is shown at 8 and the several air pipes indicated at 11, 12, 13 and 14. The ozonizer is indicated at 7 and the air vessel at 9. 1, 2, 3, 4 and 5 are automatic devices provided with electrically controlled valves which close or open the right side of the ports of the several connecting pipes. The vacuum and circulating pumps are not shown. The timing and energizing of these valves is governed by a rotary switch device 16 shown at the extreme top of the drawing.

The device 1 chiefly closes or opens the connection between the chamber 6 and the ozonizer 7. The device 2 opens or closes the supply of dry air to the chamber at atmospheric pressure, the device 3 supplying the ozonizer with dry air, the device 4 establishing a circulation of air through the pipe 15 from the chamber 6 to the ozonizer 7, and the device 5 establishes the connection between said chamber 6 and the vacuum pump 8. All the devices are connected to the vacuum pipe 8 for the reason that their mechanism is electro-pneumatic. Arrows show the direction of flow through the several pipes, and other devices not shown control the proper working of the plant as a whole.

The mean time necessary for a cycle is about ten minutes but it is to be understood that there is no absolute rule for the natural state of the woods to be treated vary greatly.

The process is carried out in the following manner:—

The wood, in planks of a suitable thickness, for example separated by wedges so as to leave a free circulation of the air between them, is first introduced into a suitable chamber such as shown at 6. This chamber, after having been closed, is subjected to the action of reduced pressure, regulated by any known means, so that the amount of said reduction of pressure may be very slight, say about half a metre of water, or about one-twentieth of an atmosphere. The wood during this first phase of the process, remains subjected therefore, for example for about ten minutes, to a pressure which is still very near atmospheric pressure. After this first action, the wood may be kept at rest, for a certain time, in the chamber, after which the second phase of the process follows. This consists in surrounding the wood, previously subjected to reduced pressure, in an atmosphere of dry air previously ozonized by means generally in use and on which it is not necessary to enlarge here. This dry ozonized air is introduced into the chamber either at atmospheric pressure, or at a slightly higher pressure, so as to evacuate the preceding rarefied atmosphere and thus carry off to the outside a very small quantity of water vapour extracted from the wood under the action of the slightly reduced pressure above mentioned. During the second phase, the wood is thus subjected, for about half an hour, to the action of the dry ozonized air. The air is then evacuated and the succession of the two phases is repeated a sufficient number of times to enable the wood, according to its nature and its state of humidity, to attain the degree of dryness required for the use to which it is to be put.

It is quite obvious that the figures given here both for the degree of vacuum in the first phase and for the duration of each of the two phases are simple illustrations intended to render the description of the process clear and that the invention will not be departed from by modifying them according to the nature and the state of the wood subjected to the process.

Claims—

1. A process for the methodical drying of wood by the treatment thereof in a chamber characterized by first subjecting the wood to a slightly reduced atmospheric pressure and then treating the wood with dry ozonized air for a suitable period of time.

2. A process for the methodical drying of wood by the treatment thereof in a chamber characterized by first subjecting said wood to a slightly reduced atmospheric pressure, for about ten minutes, and then treating the wood with dry ozonized air of a pressure slightly above atmospheric pressure for about one half an hour, with an intervening period of rest between the two stages.

3. A process for the methodical drying of wood by the treatment thereof in a chamber characterized by first subjecting the said wood to a slightly reduced atmospheric pressure for about ten minutes and then treating the wood with dry ozonized air of a pressure slightly above atmospheric pressure for about one half an hour, with an intervening period of rest between the two stages, thereafter evacuating the said air and repeating the process a sufficient number of times to attain the desired degree of dryness according to the nature of the wood under treatment.

In testimony whereof I affix my signature.

GUSTAVE FRANTZ LYON.